United States Patent Office 3,600,405
Patented Aug. 17, 1971

3,600,405
PREPARATION OF FURAN BY OXIDATION OF SPECIFIED ORGANIC COMPOUNDS
Alfio J. Besozzi, Houston, Tex., assignor to Petro-Tex Chemical Corporation, Houston, Tex.
No Drawing. Filed Dec. 30, 1968, Ser. No. 788,034
Int. Cl. C07d 5/14
U.S. Cl. 260—346.1
4 Claims

ABSTRACT OF THE DISCLOSURE

Process for the production of furan by contacting specified oxygenated organic compounds with a catalyst containing Mo and Bi atoms in the presence of oxygen and an inert diluent, under particular conditions of temperature and pressure. The reaction of crotonaldehyde to furan is preferred.

BACKGROUND OF THE INVENTION

This invention relates to a process for the production of furan, and relates more particularly to a catalytic process for the production of furan from oxygenated materials under specified conditions of temperature and pressure.

Furan is an important chemical intermediate which is employed commercially in large quantities. In particular, furan and furan type compounds are utilized industrially on a large scale. Until recently, naturally occurring vegetable materials constituted the chief source of this valuable substance since the direct oxidation of various oxygenated materials has been less attractive. A difficulty associated with such a procedure is that furan is sensitive to oxygen. Ring cleavage occurs easily under oxidation conditions and charring and uncontrolled polymerization often result. For this reason, reactions to form furan in the presence of oxygen have been generally avoided. Additionally, some difficulty has been experienced in achieving good selectivities. According to this invention, however, selective oxidation of specified oxygenated materials is accomplished by contacting these feed materials with novel catalysts under specific reaction conditions.

SUMMARY OF THE INVENTION

This invention comprises a process for the production of furan by contacting a feed material containing or comprising a member selected from the group comprising crotonaldehyde, acetals and hemi-acetals of crotonaldehyde, aldol, butadiene monoxide, crotyl alcohol, n-butyl alcohol, 1,4-butane-diol, n-butyraldehyde, and precursors thereof, and mixtures thereof, with oxygen and an inert diluent at a temperature of at least 350° C. at a vapor pressure of the feed material equivalent to less than one-half atmosphere at one atmosphere in the presence of a catalyst containing molybdenum and bismuth. More particularly, the invention relates to a process of the type described wherein catalysts containing bismuth and molybdenum are present in a ratio of from about one atom to about 15 atoms of molybdenum per atom of bismuth. Furan may be produced with good conversion by contacting crotonaldehyde or precursors thereof, or the other indicated reactants, at a temperature of at least 350° C., with a catalyst containing Bi and Mo atoms, wherein the atomic ratio of Mo atoms of Bi atoms is from about one atom to about 15 atoms of Mo per atom of Bi, in the presence of an inert diluent, and oxygen, the oxygen being present in a molar ratio of about 0.1 to about 5 mols oxygen per mol of crotonaldehyde or other reactant and at a partial pressure of crotonaldehyde or other reactant equivalent to less than one-half atmosphere when the total pressure is one atmosphere. In one form, the invention relates to a process for the preparation of furan by the oxidation of crotonaldehyde in the presence of oxygen and steam or other inert diluent at a temperature from about 350° C. to about 550° C. at a vapor pressure of the crotonaldehyde equivalent to less than one-half atmosphere at one atmosphere in the presence of a catalyst containing bismuth and molybdenum atoms in the above specified proportions. In its most preferred form the invention comprises a method for preparing furan wherein crotonaldehyde is reacted at a temperature of from about 400° C. to about 525° C. with oxygen in a molar ratio of 0.5 to 3 mols of oxygen per mol of crotonaldehyde and 2 to 30 mols of steam per mol of crotonaldehyde at a partial pressure of crotonaldehyde equivalent to less than one-half atmosphere at one atmosphere in the presence of a catalyst comprising Mo and Bi, in an atomic ratio of 1 to 10 atoms of Mo per atom of Bi. The term "precursor" as employed herein, is understood as encompassing those materials which react under the oxidation conditions of the system to give the indicated feed materials.

DETAILED DESCRIPTION OF THE INVENTION

In general, the feed materials employed in the process of this invention comprise, as indicated, such feedstocks as crotonaldehyde, acetals and hemi-acetals of crotonaldehyde, aldol, btuadiene monoxide, crotyl alcohol, n-butyl alcohol, 1,4-butanediol, n-butyraldehyde, and precursors thereof. Acetals and hemi-acetals of crotonaldehyde which are particularly suitable are those of the aliphatic alcohols of 1 to 6 carbon atoms and those of the glycols of 2 to 5 carbon atoms. Crotonaldehyde is an excellent feedstock and gives good yields of furan. Mixtures of the feed materials may be employed, and streams containing other materials which are not affected and do not interfere with the reaction may be used.

The amounts of oxygen employed may be between about 0.1 to 5 mols of oxygen per mol of organic feedstock. Molar ratios between about 0.5 to about 3.0 are satisfactory, with molar ratios of between about 1.0 and 2.0 being preferred. The oxygen and organic feed may be added to a reactor as a mixture or the oxygen may be introduced into the reaction zone separately. Preferably, the reactants are individually preheated and introduced separately into a mixing zone where the reactants are mixed just prior to contacting the catalyst.

The reaction zone temperature is maintained at a temperature above about 350° C. Temperatures between about 350° C. and about 550° C. and preferably temperatures of from about 400° C. to about 525° C. are employed. As indicated, a preheat temperature zone maintained between about 200° C. and 400° C. may also be used to good advantage.

In general, the catalyst may be prepared for the reactor by methods well known to those skilled in the art. For example, the catalyst may be deposited on catalyst supports from an aqueous slurry of the oxides or other compounds, or the support may be impregnated with the compounds in solution and then dried and heated at elevated temperatures. The particular materials from which the Mo and Bi atoms are supplied are not especially critical, as long as any anions introduced into the catalyst structure do not substantially interfere with the desired activity. For example, the actives may be introduced as the oxides, nitrates, hydroxides, carbonates, sulfates or bicarbonates. Catalyst efficiency is better if the catalyst is maintained in the oxidized form during the reaction. Other catalytically active materials may be employed in conjunction with the catalysts of the invention, and it is not intended to exclude such conjoint activity from the scope of the invention. Catalyst carriers, binding agents, or fillers may also be used, and these will generally be inert to the reactants or the reaction, although, as indicated, this is not required.

Fluidized catalyst systems are advantageously used with this invention and good results are obtained, as for example, with catalyst actives consisting essentially of the oxides of Mo and Bi deposited on crushed alundum pellets. The fluid bed catalyst may be prepared by mixing solutions of the catalyst actives in the presence of fluid supports such as α-alumina. These catalyst particles for a fluid bed process normally are less than 100 mesh and greater than 40 mesh standard screen size. It has been found that catalyst supports having relatively large pores are preferred. The percent porosity should be between about 15 and 60 percent. The surface area of the catalyst particles should be less than 25 square meters per gram and preferably is between 1 and about 10 meters per gram.

A variety of reactor types may be used in the practice of this invention; as noted, however, the fluidized bed reactor is preferred. Generally, any reactor which may be operated without creating excessive flow restriction and back pressure may be utilized. Large diameter tubular reactors which can be easily charged and emptied of catalyst particles may be employed. As indicated, the catalyst particles may vary in size, being limited however by the surface area and flow rates through the reactor employed. An essential feature of this invention is in maintaining the pressure of the feed at a pressure equivalent to less than one-half atmosphere, although the total system pressure employed in the practice of this invention may be greater or less than one atmosphere, preferably at or about 50 to 150 p.s.i.g. Good yields of furan are obtained from crotonaldehyde with the partial pressure of the crotonaldehyde being kept equivalent to below 250 millimeters of mercury absolute when the total system pressure is one atmosphere. Partial pressures of crotonaldehyde equivalent to about 15 millimeters of mercury absolute to about 200 millimeters of mercury absolute when the total system pressure is one atmosphere are preferred. Dilution of the streams with inert diluents has been found advantageous in maintaining the desired partial pressure. If desired, a combination of inert diluents and a vacuum may be used. Examples of suitable inert diluents that may be used include helium, nitrogen, methane, carbon dioxide, and the like. Steam is particularly advantageous and is much preferred. At reaction temperatures above 500° C. it is preferred that at least one-half of the inert diluent consist of steam. When the volume of steam is greater than one-half of the total inert gas volume at reaction temperatures above 500° C. crotonaldehyde selectivities to furan are improved. If the inert diluent is composed of at least 50 percent steam and the feed is crotonaldehyde, the molar ratios of total inert diluent to crotonaldehyde may be varied from about 2 to 30 mols of inert diluent per mole of crotonaldehyde.

Contact times required in the operation of this invention may be varied over a wide range. For example, contact times as low as 0.001 second to 10 seconds may be used. Contact times between 0.1 and 3 seconds are satisfactory. In general, higher contact times are required normally when lower oxidation temperatures are employed and shorter retention times may be used as the reaction temperature is increased. The invention will be illustrated by the preparation of furan from crotonaldehyde, although it is understood, of course, that the invention is not so limited.

EXAMPLE I

A stream preheated at 250° C. and containing components in a ratio, by volume, of 1 part crotonaldehyde per 2 part oxygen per 55.7 parts steam per 8 parts helium was introduced into a standard Vycor tubular fixed bed reactor which had an outside diameter of about 30 millimeters and was approximately 24 inches in length and which contained a catalyst comprising 38.2 percent $MoO_3$ and 61.8 percent $Bi_2O_3$, as 25 percent actives on commercial alundum (Norton SA 5103) ⅛" by ⅛" carrier pellets. The reaction temperature in the fixed bed was maintained at approximately 480° C. while the liquid hourly space velocity (the volume of crotonaldehyde as a liquid at standard temperature and pressure per volume of catalyst per hour) was approximately 0.10. Contact time was approximately 0.69 second. Good yields of furan were obtained.

EXAMPLE II

The procedure of Example I was repeated, except that the reaction temperature was raised to 525° C. and the contact time averaged 0.65 second. Furan was obtained in good yield.

I claim:

1. A process for the production of furan, comprising contacting a feed material containing a member selected from the group consisting of crotonaldehyde, acetals and hemi-acetals of crotonaldehyde, aldol, butadiene monoxide, crotyl alcohol, n-butyl alcohol, 1,4-butanediol, n-butyraldehyde, and mixtures thereof, with oxygen and a gaseous inert diluent at a temperature at least 350° C. at a vapor pressure of said feed material equivalent to less than one-half atmosphere at one atmosphere, in the presence of a catalyst containing molybdenum and bismuth.

2. The process of claim 1 wherein the molybdenum and bismuth are present in a ratio of from about one atom to about fifteen atoms of molybdenum per atom of bismuth.

3. The process of claim 2 wherein the feed material is crotonaldehyde.

4. The process of claim 3 wherein the oxygen is present in a molar ratio of 0.1 to 5 mols of oxygen per mol of crotonaldehyde, the temperature is from about 350° C. to 550° C., and the molybdenum and bismuth atoms are present in a ratio of from about 1 atom to about 10 atoms of molybdenum per atom of bismuth.

References Cited

UNITED STATES PATENTS 3,228,966   1/1966   Adams _____ 260—346.1

NICHOLAS S. RIZZO, Primary Examiner

B. I. DENTZ, Assistant Examiner